(12) United States Patent
Williams et al.

(10) Patent No.: US 6,999,641 B2
(45) Date of Patent: Feb. 14, 2006

(54) MEASUREMENT OF LARGE STRAINS IN ROPES USING PLASTIC OPTICAL FIBERS

(76) Inventors: Jerry Gene Williams, 1 Berryfrost La., The Woodlands, TX (US) 77380; David Barton Smith, 116 Orchard Cir., Oak Ridge, TN (US) 37830; Jeffrey David Muhs, 4023 Highway 70E, Lenoir City, TN (US) 37771

(*) Notice: Subject to any disclaimer, the term of this patent is extended or adjusted under 35 U.S.C. 154(b) by 13 days.

(21) Appl. No.: 10/430,058

(22) Filed: May 5, 2003

(65) Prior Publication Data

US 2005/0226584 A1 Oct. 13, 2005

Related U.S. Application Data

(60) Provisional application No. 60/443,311, filed on Jan. 29, 2003, provisional application No. 60/377,421, filed on May 3, 2002.

(51) Int. Cl.
*G02B 6/12* (2006.01)
(52) U.S. Cl. .............................. 385/12; 385/13; 385/5; 385/104; 356/32; 356/4.01
(58) Field of Classification Search .................. 385/12, 385/13, 5, 102, 104; 356/32, 5.09, 4.01, 356/141
See application file for complete search history.

(56) References Cited

U.S. PATENT DOCUMENTS

| | | | | |
|---|---|---|---|---|
| 5,182,779 | A | * | 1/1993 | D'Agostino et al. .......... 385/13 |
| 5,649,035 | A | * | 7/1997 | Zimmerman et al. ......... 385/13 |
| 6,246,469 | B1 | * | 6/2001 | Schier ....................... 356/5.09 |
| 2003/0094281 | A1 | * | 5/2003 | Tubel .................... 166/250.03 |

* cited by examiner

*Primary Examiner*—Fayez G. Assaf

(57) ABSTRACT

A method for the direct measurement of large strains in ropes in situ using a plastic optical fiber, for example, perfluorocarbon or polymethyl methacrylate and Optical Time-Domain Reflectometer or other light time-of-flight measurement instrumentation. Protective sheaths and guides are incorporated to protect the plastic optical fiber. In one embodiment, a small rope is braided around the plastic optical fiber to impose lateral compressive forces to restrain the plastic optical fiber from slipping and thus experience the same strain as the rope. Methods are described for making reflective interfaces along the length of the plastic optical fiber and to provide the capability to measure strain within discrete segments of the rope. Interpretation of the data allows one to calculate the accumulated strain at any point in time and to determine if the rope has experienced local damage.

14 Claims, 11 Drawing Sheets

MEASUREMENT OF LARGE STRAINS IN ROPES USING PLASTIC OPTICAL FIBERS

This application claims priority from U.S. Provisional Patent Application No. 60/377,421, filed May 3, 2002 entitled "Optical Fiber Sensor for Measuring Strain in Synthetic Ropes", and U.S. Provisional Application No. 60/443,311 filed Jan. 29, 2003 entitled "Method and Apparatus for Measuring Large Strains in Synthetic Fiber Ropes"; both herein incorporated by reference in their entirety.

This invention was made with Government support under Contract No. DE-AC05-00OR22725 awarded by the United States Department of Energy. The Government has certain rights in this invention.

FIELD OF THE INVENTION

The present invention relates to use of a plastic optical fiber and optical time-domain reflectometry or other instrumentation for the direct, in situ measurement of large strains imposed on ropes during service and, more particularly, in synthetic fiber ropes. The plastic optical fiber is integrated into the rope in several configurations which allow the plastic optical fiber to experience the same strain as the rope including the capability to monitor strain during cyclical loading. The method provides the capability to make multiple strain measurements in a single plastic optical fiber within discrete segments along the length of the fiber.

BACKGROUND OF THE INVENTION

Ropes are used in numerous applications in the marine and offshore industries as well as in onshore operations. Synthetic Fiber Mooring Rope constructed from high performance polyester is an important emerging technology which promises to advance the economical production of oil and gas from deepwater reservoirs in the Gulf of Mexico (GOM) and elsewhere around the world. The advantages of using synthetic fiber such as polyester for providing station keeping to offshore platforms, for example, Floating Production Systems Offshore (FPSO's) with a taut leg mooring system are huge weight savings, a more efficient system allowing a smaller footprint on the ocean floor, a favorable force vector to restore the platform to its neutral position, reduction in loads on the risers, and the associated lower cost. Synthetic fiber ropes are also commonly used for holding ships in position in port and for loading operations. Ropes carry high tension loads and the service environment is often hostile, potentially causing damage to ropes. Lightweight synthetic fiber mooring ropes including polyester ropes have high strength and adequate stiffness for mooring line applications, but are much more susceptible to damage than their steel counterpart. Close monitoring of their performance is, therefore, a necessary requirement to insure their continued safety and reliability. Inspection schedules, primarily visual, are rigidly enforced to insure their safe operation. In recent years the offshore oil industry has found synthetic fiber ropes to be an important economic enabling technology for the anchoring and position keeping of deepwater offshore floating platforms. A better method of inspection is needed to monitor the strain in these highly loaded ropes as they respond to loads imposed by the platforms offset due to ocean currents and surface wind and the ropes' own weight. The extreme conditions in the marine environment, especially under extreme loading conditions such as hurricanes, and due to possible damage caused by the intrusion of lines and cables from adjacent operations, can reduce the strength of the ropes. Requisite inspection procedures, based primarily on visual techniques for identifying rope damage, are regularly scheduled and rigidly enforced to insure the safe deployment and operation of the ropes. Despite the use of current inspection procedures, however, there have been accidents, damages to property and equipment, injuries and deaths due to unexpected rope failures. The merchant marine industry and the U.S. Navy are particularly concerned about this issue and the offshore oil industry and Department of the Interior's Mineral Management Service have focused numerous studies to evaluate and characterize the problem and potential consequences of rope damage and premature failure.

A reliable in situ method is needed to inspect these primary structure components to ensure their safe reliable performance over an extended period of time. Imposed peak strains are typically large in ropes (several percent) and ultimate strains, depending on the rope architecture, are often from 8 to 20 percent. Real-time knowledge of these strains is highly desirable because such information could be used to develop design guidelines defining "fitness for service" and procedures for retirement and replacement before disastrous consequences occur. The method disclosed herein provides the capability to directly measure the large axial strain imposed on ropes in service using large strain capability plastic optical fibers and a strain measurement method based on "Optical Time Domain Reflectometry" or other methods for measurement of time-of-flight of light. The industry also needs a detection method to discover the presence and severity of local damage, both in the body of the rope and in the proximity of terminations. The method described herein also provides this capability.

RELATED PUBLICATIONS

Smith, D. Barton and Williams, Jerry G.: Direct Measurement of Large Strains in Synthetic Fiber Mooring Ropes Using Polymeric Optical Fibers. 2002 Offshore Technology Conference, Houston, Tex. U.S.A. OTC Paper 14242. May 6–9, 2002.

Smith, D. Barton and Williams, Jerry G.: Monitoring Axial Strain in Synthetic Fiber Mooring Ropes Using Polymeric Optical Fibers. Submitted to be published at 22nd International Conference on Offshore Mechanics and Arctic Engineering, Cancun, Mexico. Jun. 8–13, 2003.

Synthetic Fiber Mooring Rope Considerations and the Embodiment of the Strain Measurement Method The ultimate strain capability for polyester mooring rope, including the kinematic response due to the twisted and braided architecture of the rope and stretch in response to load, is 8% or higher. The literature suggests that the accumulative strain at failure of polyester rope, within a narrow range, is almost a constant, independent of load path or load history. Mandell teaches that "the tensile fatigue behavior of nylon and polyester single fibers and yarn is characterized as a simple process of accumulation of creep strain and failure occurs at a strain that is similar to the static strain to failure" ("Modeling of Marine Rope Fatigue Behavior," Textile Research Institute, June 1987, pp. 318–329).

Measurement of the accumulative strain in the rope should provide a reliable structural health monitoring method for ropes used as primary structure. Measurement of the state of strain in the rope, including accumulated strain, should therefore provide a reliable benchmark with which to estimate the remaining life of the rope and allow the establishment of meaningful criteria for rope recertification or retirement. Such measurements would be particularly useful following installation and after hurricanes or other major disturbances. The method described herein provides a reliable non-destructive technique for making direct measurement of the axial strain in a mooring rope using plastic optical fibers which are capable of withstanding a large number of cycles of high strain and a strain measurement method based on Optical Time Domain Reflectometry or other time-of-flight instrumentation.

Highly elastic plastic optical fibers can withstand longitudinal strains on the order of 10 percent or more, through many hundreds or thousands of cycles, making them attractive as a means to directly measure the axial strain response of the rope. This strain sensing technique differs markedly from the common Bragg diffraction grating technology in that it can measure much larger strain values. Rather than being an interference or diffraction-type sensor; the time-domain method uses the time of flight of light to measure distances and therefore changes in length, i.e., strain.

The OTDR technique is an adaptation of a method used by the telecommunications industry to accurately locate splices, losses and breaks in fiber optic cables over long distances and is the preferred method for making large strain measurements in ropes. Alternative optical techniques, similar to or dramatically distinct from the OTDR technique, however, are also applicable to locating physical interfaces in the optical fibers and measuring their spatial positions along the fiber with accuracies suitable for strain measurements. For instance, Optical Frequency Domain Reflectometry (OFDR) is well suited to this task as its primary use is for measuring reflections in optical fiber networks. In an OFDR instrument, the optical frequency of the signal laser is modulated in a periodic manner. The OFDR instrument uses an internal reflection to provide a reference of the modulated output. Light reflected from interfaces in the fiber returns to the ORDR, and these light signals are mixed with the reference signal, producing a mixture of optical frequencies. The waveform resulting from this frequency mixture is then analyzed using Fast-Fourier Transfer (FFT) signal analysis. This analysis provides information on the spatial positions of the reflectances and the magnitudes of the reflections. The primary advantages of the OFDR technique are the excellent signal-to-noise and dynamic range characteristics.

Plastic Optical Fiber Formulations

The basic principles of using glass optical fibers are well established within the communication industry applications. Although plastic fibers have been developed and studied for the communications industry, they have been of less interest because they exhibit higher attenuation than glass optical fibers and the communications industry application does not have a need for high strain capability. Optical fibers used in communications, of course, must travel great distances; whereas, the distance needed for the mooring rope application is orders of magnitude shorter. On the other hand, the loss of signal in a plastic fiber is a definite challenge since their attenuation (loss of light energy) is much greater. To overcome this limitation, several candidate plastic fibers have been studied and methods evaluated to achieve a high strength signal through amplification, optimum selection of laser signal wavelength, reflection parameters, and collection and amplification of the reflected light generated signal.

The introduction of plastic (polymeric) optical fiber actually preceded the introduction of glass optical fiber. The DuPont Corporation first developed plastic fibers for illumination engineering applications in the late 1960's. Thirty years later there is continued, albeit re-focused, commercial interest in plastic optical fiber as a viable data carrier in special installations with data transmission rates of 300 megabit/s to 3 gigabit/s. Plastic optical fiber provides a "faster" signal than copper wire and is therefore attractive for Ethernet and multimedia applications. In the present rope application the large bandwidth is an advantage.

Rope Architecture Considerations

Ropes have many different architectures, depending on the specific application. Merchant marine ropes used for mooring a boat to a dock are braided, twisted or of wire rope construction designed to resist wear as well as to provide high strength. Constructions used for mooring ropes in which the design constraint is primarily axial stiffness (to limit platform offset) have the fibers laid almost parallel with the axis of the rope. A high strength mooring rope is typically constructed of many twisted or braided elements used to form larger subropes which are subsequently laid side-by-side or braided with a small braid angle and encapsulated in an external braid to create a large diameter rope.

Integration of Optical Fiber into Mooring Ropes

One of the primary challenges is how best to integrate the optical fiber into the assembly to insure that the optical fiber experiences the same strain as the mooring rope and is protected such that it is not damaged during a long service life. In addition, it is important that the rope does not impose loads on the optical fiber that cause severe local bending since bending can cause attenuation of the light signal. The location of the optical fiber within the mooring rope is thus an essential part of a successful system. A rope under load exerts lateral force that creates friction between adjacent fibers. The interior of the rope experiences higher lateral force and friction than fibers near the surface of the rope. Positioning the optical fiber in elements in the interior of the rope protects the optical fiber and imposes the restrain to keep it from slipping. Too much lateral compressive pressure, however, can also create attenuation and change the light transmission characteristics. The rope architecture is thus another important design parameter.

Configuration 1:

One representative rope configuration studied is a subrope that is part of an assembly that includes many subropes laid parallel to form a large tensile capacity rope. Each subrope is composed of five elements, four larger twisted elements surrounding a smaller axially oriented central element. The center element is not twisted and is thus an ideal location for a plastic optical fiber to directly measure the axial strain in the rope. Positioning of optical fibers in the twisted strands was also investigated and is an alternative option.

Data generated in tests conducted by the inventors shows that the OTDR measurement of strain is in close agreement with the measured applied strain. Some resolution problems are inherently characteristic of measurements on short length specimens characteristic of these lab tests (2-ft), which will not occur for longer length ropes typically used in marine applications. The ends of the optical fiber were physically attached to the rope in most of these lab tests to insure that they experience the same strain as the rope. One of the most important discoveries found in these early tests was that a braided jacket with a braid angle of around 45-degrees surrounding the near axial oriented polyester fibers was inadequate to locally restrain the plastic optical fiber. In a large diameter rope generating larger lateral forces, it is possible the optical fiber would be fully restrained without physically fixing the ends of the optical fiber. The importance of restraining the optical fiber locally is that only then can local strain anomalies be measured such as would occur when a rope is damaged. For some rope configurations a more affirmative method is needed to assure that the plastic optical fiber is restrained to experience the same strain as the rope into which it is placed.

It is important that the manufacturing process not damage the optical fiber by imposing small radius bends upon it. As discussed above, local bending of the optical fiber can create significant attenuation, which limits the fibers ability to transmit light, and consequently the length of rope that can be strain monitored with a single plastic optical fiber. Product literature for Lucina™ or CYTOPS™ fiber from Asahi Glass Company indicates an attenuation of approximately 0.1 dB when the fiber is bent at a radius of 4 cm.

Configuration 2:

A second configuration was investigated to develop better methods of gripping the optical fiber and to develop methods to prevent local bending or damage to the optical fiber during loading. In this configuration, the plastic optical fiber was inserted in a small-diameter 8-strand braid. For study purposes, a small braided rope optics carrier with a shallow braid angle of approximately 10-degrees relative to axial was chosen. A shallow braid angle imposes a greater lateral force on the plastic optical fiber inserted in the center than larger angle braids much like the well-known "Chinese Finger" puzzle. The insertion of the plastic optical fiber into the interior of the braid was done manually in the laboratory. In practice, the insertion will be performed during manufacturing.

Tension tests were conducted on the braided rope optics carrier with end couplings and a Lucina™ plastic optical fiber integrated into the interior of the rope. The length of the loaded portion of the plastic optical fiber in these test specimens was approximately 52 inches. This length provided much better OTDR measurement resolution than earlier tests conducted on specimens approximately half this length. The optical fiber was introduced into the braided rope optics carrier in the body of the rope outside the rope end connection without any additional end constraint. The braided rope optics carrier with a shallow braid angle (10 degrees) provided the necessary lateral force to restrain the optical fiber locally to experience the same axial strain as the rope.

Representative data from tests presented in FIGS. 8 and 9 exhibit excellent correlation between the applied axial strain and the OTDR optical fiber strain measurements and substantiates that the optical fiber is restrained from slipping within the braid with the OTDR strain measurement initiating almost at the onset of stretching of the rope.

Protection of the Plastic Optical Fiber

Plastic optical fibers are susceptible to damage and methods are described herein to provide greater protection. A first method is to encapsulate the optical fibers in a hard plastic outer sheath. For the tests at hand, the 500-micrometer outside diameter Lucina™ optical fiber was manually inserted in the polyvinyl chloride (PVC) plastic furcation tubing (Fiber Instrument Sales part number F00FR900RO). The data shown in FIGS. 8 and 9 were recorded with a hard plastic outer sheath. Even though the optical fibers were free to move relative to the external plastic tube at zero load, the application of a small axial load laterally compressed the tube and frictional forces between the fiber and tubing were sufficient to keep the fiber from slipping, as evidenced by the good agreement in the data between the applied and measured strains. A tension load of only 2 pounds in the braided polyester rope optical fiber carrier was sufficient to restrain the optical fiber from moving inside the tube. The design factor, which allows this remarkable result, is the use of a braided configuration with a small braid angle to encapsulate the small optical fiber bundle and apply lateral compressive force upon it. As noted above a braid angle of around 10 degrees (±5 degrees) is near optimum to achieve this effect.

Plastic Optical Fiber Ingress and Egress into and Out of the Rope

It was found at very high strains (around 10 percent) that the braided rope imposed small radius curvature on the optical fiber-plastic cover bundle at the entry point and caused significant loss of light signal to the OTDR. The solution developed to address this problem is to insert the optical fiber bundle into a ingress-egress guide such as a small diameter stiff metal or plastic tube at the point of entry into the rope.

Signal Transfer from Remote Sections of the Mooring Rope

The ability to monitor the strain in ropes around 1000-ft long is consistent with the attenuation expected from a plastic optical fiber of this length positioned inside a mooring rope. Synthetic fiber mooring ropes segments are limited by transportation and handling to lengths of around 2500 feet. Many segments are typically jointed to bridge the entire distance from the platform to the sea bed which in deepwater would require several segments jointed together. To monitor a complete mooring line (i.e., approximately 14,000-ft long in 10,000-ft of ocean water depth); it may be necessary to have the capability to send a light signal from remote distances. The practical problem of how to bring the light signal from remote sections of a long length of rope longer than that permissible by a single plastic optical fiber is still under development. As noted above, it is believed possible to monitor a single length of rope using a single polymeric optical fiber for lengths of 1000 feet or more. In time the attenuation characteristics of plastic optical fibers will improve; however, at present, it unlikely that a single plastic optical fiber will have sufficient limited light loss to be able to monitor a length of 10,000 feet or more. The technique, however, is sufficient to monitor the top section of rope that is considered the most important section and representative of the performance of the other sections of the rope. When a practical method is developed to transmit the signal from remote sections, one could also monitor the section of the rope connected to the chain at the ocean floor, which is also considered a critical region of the rope. In applications involving the inspection of shorter length ropes, the strain in the rope can be measured using a plastic optical fiber looped from the point of origin and back and forth and thus increase the sensitivity. The light signal can either be reflected or received at the end without the use of reflective interfaces in the plastic optical fiber.

Two approaches have been considered to achieve the transport of the signal to the surface for the measure the strain in ropes longer than the limit of practical light transmission by a single plastic fiber or in rope segments remote from the surface, i.e., several thousand feet below. First, glass optical fibers can be used which have lower attenuation, but as noted above, glass optical fibers cannot directly bridge the long length because strains typically imposed exceed the breaking strain of glass fibers. It will be necessary, therefore, to isolate the glass optical fibers from the rope to avoid imposing axial strain on them. The second method is to collect the data remotely and transmit the signal to the surface or to use repeaters to amplify the signal. This is cumbersome requiring power at ocean depths and has practical limitations. OTDR instrumentation could be located remotely and transmit the data rather than the light signal to the surface, but this would impose severe complications.

Visual inspection with a Remotely Operated Vehicle (ROV) is the method commonly used to monitor the integrity of synthetic fiber ropes in offshore mooring rope applications.

Petrobras, the Brazilian national oil company, has pioneered the use of synthetic fiber mooring ropes for mooring offshore platforms and has approached the inspection issue by (1) using an ROV to inspect the ropes visually and (2) placing short sections of mooring rope in the string near the surface and periodically removing and testing them to determine residual strength. This approach is being conducted because no strain measurement or other system is available to provide more definitive in situ inspection. This short test section removal approach is also being used in initial installations approved by the U.S. Minerals Management Service for Gulf of Mexico operations.

An alternative fiber optic sensor technology to measure the strain in mooring ropes is being developed and promoted by a consortium from the European Union (Ultra-Deep Engineering: UK Study Simulating Strains of Long-Term Service on Long Polyester Ropes, Textile Research Institute, June 1997, pp. 318–329). This development, marketed as "Optical Scanning Apparatus for Ropes" or OSCAR, reportedly uses single-mode glass optical fibers and a Brillouin optical time domain reflectometer to detect the effects of strain in the fibers.

A U.S. patent search did not discover any awarded or pending patents covering the topic of plastic optical fibers for the direct measurement of large strains such as are commonly imposed on ropes.

A method is described by D'Agostino, et al. in U.S. Pat. No. 5,182,779 for the measurement of small strains in ropes using glass optical fibers. The method taught in U.S. Pat. No. 5,182,779 is not applicable to the direct measure of large strain in ropes because the small ultimate strain capability of glass optical fibers does not allow it. Although glass fibers have an ultimate strain capability on the order of 2 percent, practical limitations impose a strain limit of less than 1 percent. Mooring ropes on the other hand can experience strains an order of magnitude higher, as high as 10 percent and higher before failing, with typical ultimate design strains for mooring ropes of approximately 3 to 4 percent. The intent of U.S. Pat. No. 5,182,779 was to provide a means for measuring the strain in ropes incorporated as members in aircraft wing structure and civil engineering structures such as cables used in bridge construction or elevator lifts. In order to not overstress the metal components of the truss, the rope elements of the truss must be designed to also experience small strains. Bridge and elevator cables are typically steel wire rope and as such the design strain is normally limited to less than 0.2 percent (60,000 psi stress) and if constructed of synthetic fiber have practical deformation limitations and associated low strains. As highlighted in the abstract, the invention provides "a system for monitoring strains and stresses on rope structures and rigid structures—"; implying small strains. The method is thus limited to measurement in metallic and composite structures experiencing small strains. The inventors recognized the strain limitation of glass optical fibers and propose prestressing the rope to overcome this limitation. The prestressing approach is not practical for mooring ropes used to maintain position in offshore platforms and the inventors do not teach how to use the technique without overstressing the glass optical fiber even for small strains. The patent never considered plastic optical fibers and the word plastic is used only once in U.S. Pat. No. 5,182,779 where it pertains to placing a plastic coating onto the glass optical fiber; "Glass is commonly used for both the core and clad, along with an acrylate plastic coating". Plastic is commonly used as a coating in the fiber optics industry to protect glass optical fiber from the environment and damage. The inventors did not need large strain capability for the purposes of their invention as indicated above and never envisioned the use of plastic optical fibers in their invention. U.S. Pat. No. 5,182,779 cannot serve the purposes of measuring large strains in ropes such as experienced in service by ropes using in the marine industry including offshore platform mooring ropes.

Measurement of local strains in typical metallic and composite structures using straight glass optical fibers and OTDR instrumentation is not practical because of the extremely low sensitivity of the OTDR method when used for short gage lengths. An optical strain gage patch method is taught in U.S. Pat. No. 5,649,035 by Zimmerman et al. to overcome this limitation and provide the capability to measure the strain in short gage lengths for structures such as bridge columns and aircraft components which typically have strains an order magnitude smaller than strains associated with mooring ropes. The method uses a glass optical fiber embedded in the structure or bonded to it, a laser light source and an Optical Time Domain Reflectometry Instrument to make strain measurements. The inventors of U.S. Pat. No. 5,649,035 provide a solution to the short gage length problem by making a strain gauge patch consisting of glass optical fibers looped multiple times in a principal direction over a short gage length and thus increase the resolution for OTDR instrumentation measurements. The resolution for time measurement using the method defined in U.S. Pat. No. 5,649,035 is ±1 picosecond. This corresponds to a strain measurement resolution for typical short gages lengths of approximately ±0.013 percent. Most metallic and composite structural applications require a strain measurement resolution at least one order of magnitude greater. The inventors of U.S. Pat. No. 5,649,035 indicate the length of the glass optical fiber within the loop could be as great as 10 meters. A rope has a long linear structure orders or magnitude longer than the typical gage length desired for metallic or composite structures allowing the OTDR strain method described in the present invention to be applicable to ropes without the complication of looping. In addition, typical strains in a rope are an order of magnitude larger than strains in typical metallic or composite structures making glass optical fibers unacceptable. Glass optical fibers are adequate for the purposes of the optical strain gage patch with looped glass optical fibers and the inventors of U.S. Pat. No. 5,649,035 did not consider the use of plastic optical fibers in their patent. They state that the optical fiber is of the type used in the telecommunication systems. The telecommunication industry uses glass optical fiber because the attenuation of plastic fibers over long lengths would be unacceptable. The patent is not intended for large strains and plastic optical fibers are not mentioned in the patent. The only reference to plastic is as a coating for the glass optical fiber.

U.S. Pat. No. 6,268,911 B1 by Tubel, et al. teaches how to utilize fiber optics for monitoring down hole parameters such as temperature, pressure, fluid flow, fluid level, displacement, vibration, rotation, acceleration, acoustic velocity, chemical species, acoustic field, electric field, radiation, pH, humidity, electrical field, magnetic field, corrosion, density, formation properties, chemical properties; and to monitor the operation and condition of down hole tools including vibration, noise, strain, stress, displacement, flow rate, mechanical integrity, corrosion, erosion, scale, paraffin and hydrate. The patent teaches these uses for glass optical fiber, but does not address the use of plastic optical fiber or measuring strain in ropes. In one embodiment glass optical fiber is embedded in a data transmission cable for downhole applications.

The deficiency of the visual inspection method is that it reveals nothing about the load-strain history of the rope or the state of internal wear or degradation. Mooring ropes proposed for offshore platforms can be very large, e.g., a foot or more in diameter, several 1000s of feet in length, and capable of carrying 1 to 5 million pounds of load. For such large ropes, one cannot visually detect internal wear or damage. In addition, it is difficult to reliably inspect long length mooring ropes in situ using, for example, ROV technology.

The short rope segment removal and testing method for determining "fitness for service" of mooring ropes used for station keeping of offshore platforms is an expensive operation and the removal activity itself introduces operational hazards. Rope termination inefficiencies introduced by the inability to make all subropes which constitute the rope of equal length (and thus to share load equally) is amplified for short rope segments. The short length rope test segments thus can provide a weaker link than the longer length segments which constitute the remainder of the rope, and their introduction can thus reduce the overall strength of the rope in service. A more definitive method, such as that disclosed herein, would provide higher reliably and greater assurance of safe operations.

The OSCAR technique differs from the technique disclosed herein by its use of the conventional glass optical fibers, which cannot undergo strains beyond the breaking strain of glass fibers, which is approximately 2% strain. More practically, the technique is probably limited to strain in the glass optical fiber on the order of 1 percent. OSCAR overcomes the glass fiber strain limitation by winding the glass fiber in a helix around an elastic solid cylinder. The helix angle is selected to insure that only a small portion of the applied axial strain is imposed on the glass optical fiber. In this way, large strains in the cylinder induce much smaller strains in the glass fiber, and the strain in the fiber is proportional to the strain in the cylinder, which follows the axial strain in the rope. The solid cylinder is a large inclusion in the cross section of the rope, having a diameter on the order of 2 cm. This is a large inclusion which interferes with the architectural design of the rope and whose presence could affect the mechanical properties of the rope. More importantly, the indirect measurement of strain is much less accurate and conclusive than the direct measurement of strain in the mooring rope permitted by the large strain capability of plastic optical fibers described herein. Although the developers claim that the technique can detect local damage, the magnitude of the local strain is not measured.

It is therefore an object of the invention to use plastic optical fibers including those composed of perfluorocarbon, polymethyl methacrylate and other plastic materials for the purpose of making large strain measurements.

It is therefore an object of the invention to use Optical Time-Domain Reflectometry or other methods of measuring the time for light to travel along a length of optical fibers, such as Optical Frequency Domain Reflectometry, for the purpose of detecting and quantifying large strains in ropes.

It is therefore an object of the invention to use plastic optical fibers for the purpose of making strain measurements using Bragg detraction gratings.

It is therefore an object of the invention to provide a direct measurement of large strains in ropes, in particular, strains in synthetic fiber ropes such as the type used to moor floating platforms and to dock marine vessels including those with twisted, braided, helical wound, wire rope or other constructions.

It is therefore an object of the invention to use the strain measurement method described herein to provide measurements of the location and magnitude of local strains within discrete segments along the length of the rope.

It is therefore an object of the invention to use the strain measurement method described herein to provide measurements of local strains to determine strain concentrations and local anomalies which occur in the region of the terminations of synthetic fiber ropes including eye-splice type termination.

It is therefore an object of the invention to provide a method for the measurement of accumulated strain in the rope and to use this information to enable procedures to predict the remaining life of the rope.

It is therefore an object of the invention to provide an outer plastic protective sheath to protect the plastic optical fiber from the environment including sea water and service damage.

It is therefore an object of the invention to provide a protective ingress-egress guide for preventing damage to the plastic optical fiber from bending and abrasion at the point of ingress into and egress from the rope.

It is therefore an object of the invention to provide a small braided rope optics carrier which imposes a lateral force onto the plastic optical fiber and plastic protective sheath sufficient to restrain the assembly locally from slipping within the rope.

It is therefore an object of the invention to provide a small braided rope optics carrier for the plastic optical fiber and plastic protective sheath composed of a braided rope with a small braid angle construction on the order of 10-degrees (+ or − 5 degrees) relative to the rope axis with the plastic optical fiber positioned inside the braid and whose purpose is to impose lateral force on the plastic optical fiber to restrain it from slipping during the application of load.

It is therefore an object of the invention to provide a strain measurement system which occupies a small fraction of the rope's total volume or cross-section and thus does not appreciably alter the mechanical properties of the rope or make the rope more difficult to handle or deploy.

It is therefore an object of the invention to provide a strain monitoring system which can monitor the strain in ropes of different architectures including braided, twisted, or wire rope construction and within one or more subropes or elements within the rope assembly.

It is therefore an object of the invention to provide a means to incorporate multiple plastic optical fiber strain sensors within a rope assembly.

It is therefore an object of the invention to provide a capability through multiplexing to allow numerous plastic fiber optics to be monitored by a single instrument.

It is therefore an object of the invention to provide methods for making reflective interfaces on the plastic optical fiber at selected positions along the length of the fiber.

It is therefore an object of the invention to provide an in situ method for locating the position and quantifying the damage which has been imposed upon ropes in service.

SUMMARY OF THE INVENTION

In accordance with the present invention, there is provided a method for the direct in situ measurement of large strains on the order of 0- to 15-percent or more in ropes using plastic optical fibers and Optical Time-Domain Reflectometer or other light time-of-flight measurement instrumentation such as Optical Frequency Domain Reflectometry. A plastic protective sheath and ingress-egress guides are incorporated to protect the plastic optical fiber in the marine environment and in the transition region of ingress into and egress out of the rope. A small braided rope optics carrier with minimal intrusion in the rope cross-section is one embodiment of the method which allows lateral compressive forces to be applied to the plastic optical fiber and restrain it from slipping and thus experience the same strain as the rope. The braided rope optics carrier can be incorporated in numerous rope configurations including braided, twisted, helical or wire rope constructions. A method is described for etching reflective interfaces at selected locations along the length of the plastic optical fiber. The method allows multiple reflective interfaces within a single fiber and thus provides the capability to measure strain along the entire length of the rope and within discrete length segments along the fiber's length. Multiplexing of the light signal allows monitoring of several plastic optical fibers and multiple segments within a fiber using a single light time-of-flight instrument. Interpretation of the data allows one to calculate the accumulated strain at any point in time and to determine if the rope has experienced local damage. Perfluorocarbon and polymethyl methacrylate are representative plastic optical fibers with the ability to track the cyclical large strains typically experienced by ropes used in the marine industry including mooring ropes used for station keeping on offshore platforms and marine ropes used to dock vessels.

BRIEF DESCRIPTION OF THE DRAWINGS

A complete understanding of the present invention may be obtained by reference to the accompanying drawings, when considered in conjunction with the subsequent, detailed description, in which:

In FIG. 11, the first interface had a shorter exposure time than did the second interface; and For purposes of clarity and brevity, like elements and components will bear the same designations and numbering throughout the FIGURES.

DESCRIPTION OF THE PREFERRED EMBODIMENT

Generally speaking, the invention pertains to a method for making large in situ strain measurements, in particular, strain experienced in service by ropes such as offshore platform mooring ropes or docking ropes using a plastic optical fiber and a time-of-flight of light measurement technique involving instrumentation such as Optical Time Domain Reflectometry or Optical Frequency Domain Reflectometry. The application on an offshore platform mooring line features multiple sets of plastic optical fibers, multiple reflective surface within the plastic optical fiber to allow strain to be measured in discrete lengths of plastic optical fiber and thus the rope, and multiplexing to allow large numbers of measurements to be taken by a single Optical Time Domain Reflectometry or Optical Frequency Domain Reflectometry instrument.

Now referring to FIGS. 1 through 7, which teach the details of a method which can be exercised to achieve accurate reliable data for the measurement of large strain in ropes. In addition, FIGS. 8 through 11 provide date in graphical representation which validate the capability of this method to make large strain measurements.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Figure 1:
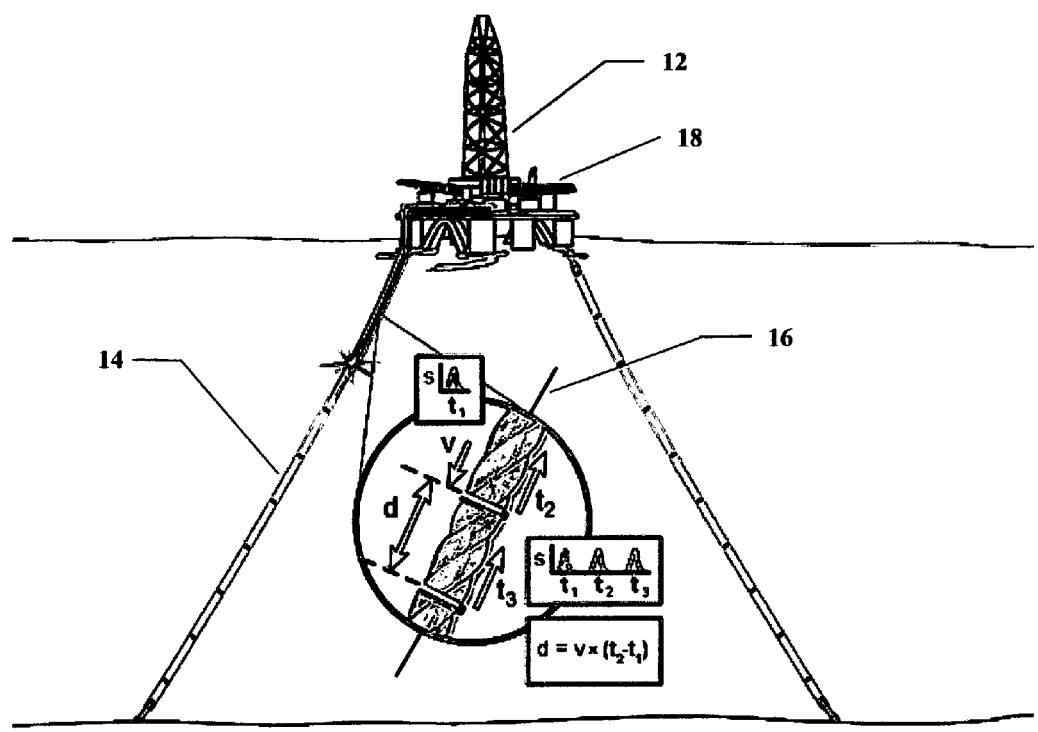
FIG. 1 is a perspective view of the plastic optical fiber 16 strain measurement method with an Optical Time-Domain Reflectometer 18 data acquisitions system deployed to monitor strain in an offshore platform 12 synthetic fiber mooring rope 14.

The invention is best described by reference to the drawings. FIG. 1 shows an offshore platform 12 with synthetic fiber mooring rope 14. The plastic optical fiber 16 is embedded within one or more of the mooring ropes. An Optical Time Domain Reflectometer (OTDR) 18 is located on the offshore platform deck and is capable of monitoring a multiplicity of plastic optical fibers located within the one or more synthetic fiber mooring ropes. When a pulse of light from the OTDR is launched into the optical fiber, it propagates with speed v through the fiber. When it reaches a partially reflective interface present at a strategically chosen position along the fiber, a fraction of the light is reflected and the remainder is transmitted. The reflected pulse is transmitted back along the fiber and returns to the OTDR, where its roundtrip transit time and its intensity are measured and recorded. The distance to the interface is equal to the speed of the pulse multiplied by the time t required for the pulse to reach the interface, where t is one-half the value of the roundtrip transit time. The transmitted pulse continues along the fiber until it reaches another partially reflective element. Again the pulse is partially reflected and returns to the OTDR. The distance d between any two partially reflective interfaces can be determined by $$d = (v \times t_2) - (v \times t_1) = v \times (t_2 - t_1)$$

where $t_1$ is the transit time to the nearer interface and $t_2$ is the transit time to the farther interface. When the segment of mooring rope between the interfaces is strained (stretched), the embedded optical fiber experiences a corresponding strain and the distance d increases. The strain present in that segment of the rope is equal to the change in d divided by the initial value of d. Thus the strain in the rope is directly determined by the corresponding strain in the fiber. Furthermore, strain measurements can be made at multiple positions along the fiber by placing a succession of interfaces in the fiber and monitoring the reflections that occur at the interfaces.

Figure 2:
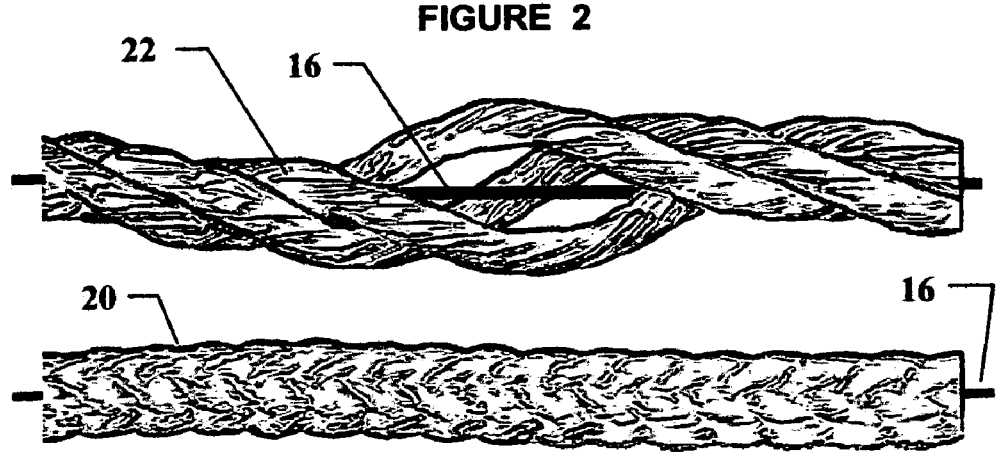
FIG. 2 is a perspective view of a synthetic fiber subrope with twisted subrope 22 with a plastic optical fiber 16 inserted into the center of the three twisted strands and a braided subrope 20 with the plastic optical fiber 16 inserted into the center of the braided subrope.
Figure 3:
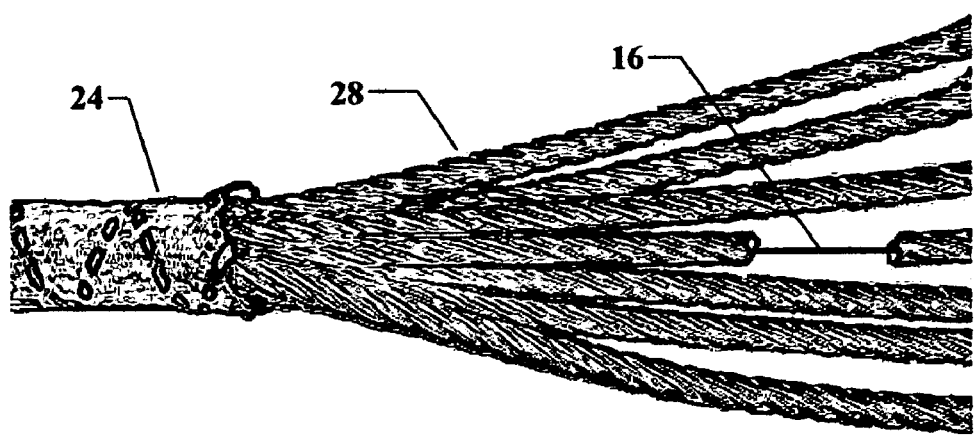
FIG. 3 is a perspective view of a synthetic fiber rope 24 with twisted subropes 28 illustrating the location of the plastic optical fiber 16 within subropes and laid parallel to the subropes.
Figure 4:
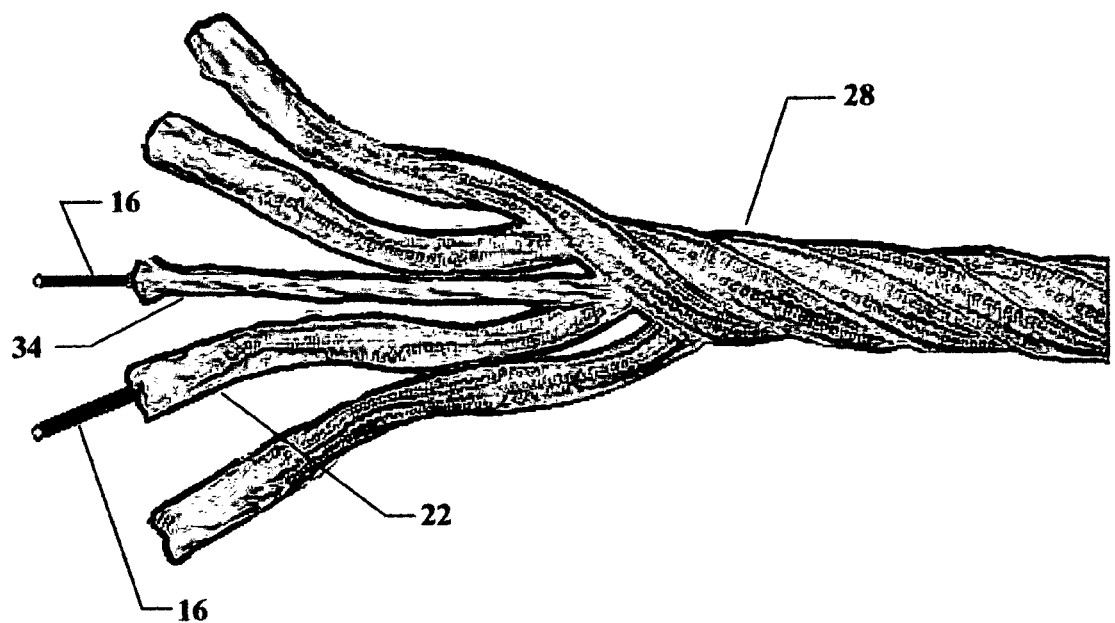
FIG. 4 is a perspective view of a five element twisted subrope 28 with four twisted rope elements 22 surrounding an axial oriented center core element 34 and with plastic optical fibers 16 located within the center core element 34 and within one of the twisted rope elements 22.

FIG. 2 and FIG. 3 illustrate how the plastic optical fiber 16 can be placed within typical synthetic fiber mooring rope 14 designs. In the twisted mooring rope element 22, the plastic optical fiber is in the center of the three elements. In the braided rope element 20, the plastic optical fiber is located within the center of the braid. In the large rope shown in FIG. 3 the plastic optical fiber 16 can be located within subropes 28 which are the building unit to construct the synthetic fiber rope 24. FIG. 4 illustrates how the plastic optical fiber 16 can be inserted into a twisted rope element 22 of subrope 28.

Figure 5:
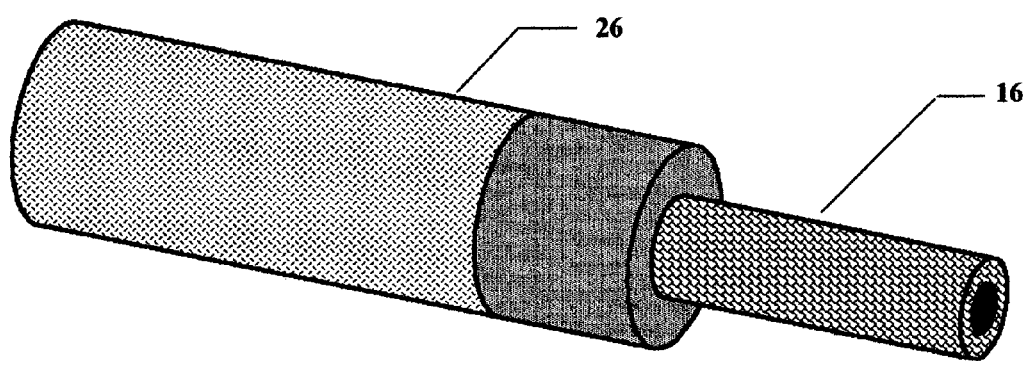
FIG. 5 is a sketch showing the plastic optical fiber 16 inserted into the plastic protective sheath 26.

FIG. 5 shows a method of construction to help protect the plastic optical fiber 16 from damage from bending or the environment such as seawater. The plastic optical fiber 16 is encapsulated in a plastic protective sheath 26. The plastic protective sheath may be bonded such as extruded or sprayed onto the plastic optical fiber but it can also be loose or unbonded as proven in tests conducted in support of this development.

Figure 6:
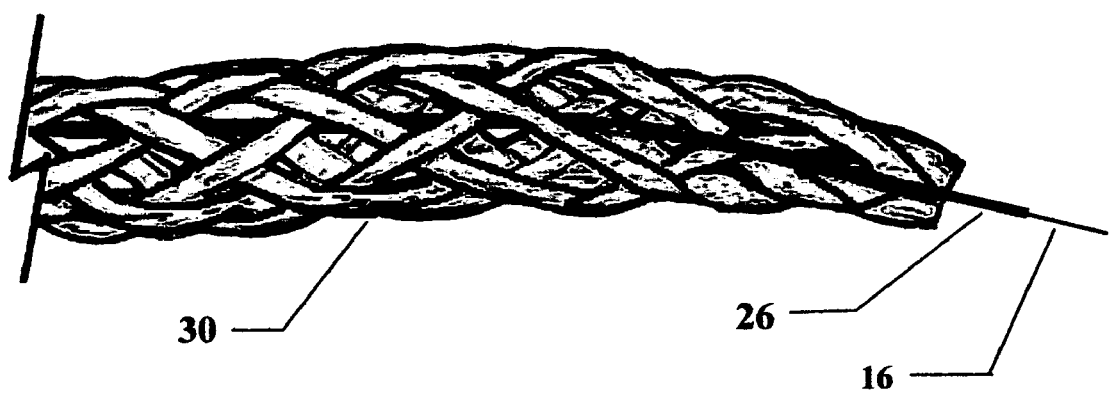
FIG. 6 a small braided rope optics carrier 30 surrounding a plastic optical fiber bundle in which the plastic optical fiber 16 and plastic protective sheath 26 are located at the center of the braided rope optics carrier 30.

FIG. 6 illustrates a method for using a braided rope optics carrier 30 containing a plastic optical fiber 16 encapsulated in an plastic protective sheath 26 as an element specifically inserted into a rope for the purpose of making large strain measurements. The braided rope optics carrier allows lateral compressive loads to be applied to the plastic optical fiber at very low strains and is sufficient to restrain it from slipping. The angle of the braid most effective to accomplish this restraining is 10-degrees + or − 5-degrees.

Figure 7:
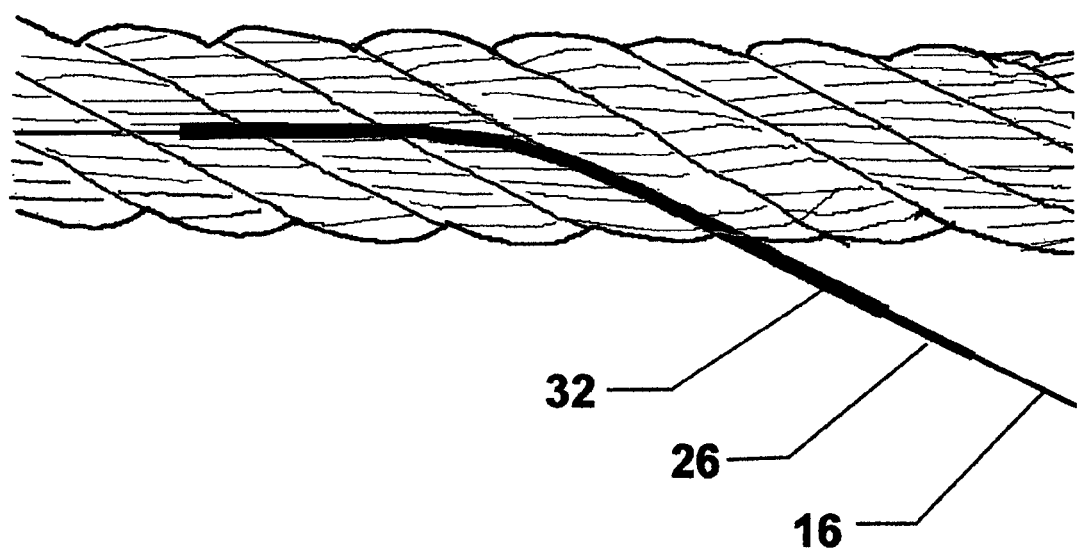
FIG. 7 illustrates the method of using an ingress-egress guide 32 constructed of metal or plastic to protect the plastic optical fiber 16 and plastic protective sheath 26 against critical bending and damage at locations of ingress into and egress from the synthetic fiber rope.

An ingress-egress guide 32 constructed of metal or plastic inserted at location of ingress and egress of the plastic optical fiber 16 and plastic protective sheath 26 as shown in FIG. 7 was found to suppress bending damage to the plastic optical fiber 16.

An OTDR measures spatial positions along an optical fiber by launching brief pulses of light into one end of the fiber and then detecting the light that "bounces back" as a reflection from an abnormality in the fiber. For instance, light is reflected from physical interfaces inserted at selected locations along a fiber embedded in a mooring rope, shown schematically in FIG. 1. By measuring the transit time of the reflected pulses and by knowing the speed at which light travels in the optical fiber, a very accurate measure of the distance to each reflective interface can be attained. A series of reflective interfaces can be placed in the plastic optical fiber to provide discrete gauge lengths along the rope. Each interface reflects a small percent of the light and transmits the rest. An OTDR with a picosecond pulsed light source can measure distances with an accuracy of about 0.4 inches, yielding strain measurements of 0.1% over a 33 foot gauge length segment.

It is anticipated that each plastic optical fiber will provide a multiplicity of strain measurements along a 1,000-foot mooring rope. This multiplicity can be accomplished by spacing the reflective interfaces at 1 to 100 foot intervals in the fiber. The interval between reflective interfaces determines the gauge length of the strain measurement. This gauge length can be arbitrarily chosen to yield strain measurements as required. For example, it might be desirable to have small gauge lengths in the vicinity of the rope termination. Reflective interfaces can placed into the plastic optical fiber through one of many techniques, including those that involve splicing, fusing, fiber coupling, or writing gratings. Customized software algorithms are used to measure strain between adjacent reflective interfaces. With multiplexing techniques, it is possible to monitor several mooring ropes in rapid sequence. Such measurements, when compared with pre-established design guidelines, will allow remedial action to be taken as specified.

A preferred method for producing the interfaces is to write Bragg gratings directly onto the core of the fiber. This technique is well known in fiber optic practice. It involves the creation of an interference pattern within the core of the fiber, using a laser (typically ultraviolet wavelength) and a phase mask chosen to work with the laser wavelength and to yield a grating spacing in the fiber that reflects a fraction of the transmitted light in the fiber.

In the present application, one of the most important attributes is that the plastic optical fiber exhibits the ability to stretch and recover to the original length when subjected to cycles of large tensile strains. The extension-relaxation characteristics of plastic optical fibers constructed of perfluorocarbon and polymethyl methacrylate were found to closely match the response of material commonly used in ropes such as polyester.

The underpinning of the technology for rope strain monitoring is therefore the high strain capability characteristic of plastic optical fibers. Most commercially available plastic optical fibers are formulated from or with polymethyl methacrylate. Two commercially available formulations of this type of fiber have been evaluated. The second class of polymer studied is a perfluorocarbon.

| Composition of Optical Fiber Core | Attenuation at 850 nm, dB/meter | Approximate Core Diameter, mm | Approximate Reflectivity Index at 850 nm |
| --- | --- | --- | --- |
| Polymethyl methacrylate | 2 | 250 | 1.49 |
| Perfluorocarbon | 0.03 | 250 | 1.35 |
| Glass | <3 × 10$^{-3}$ | 0.007 | 1.46 |

Figure 8:
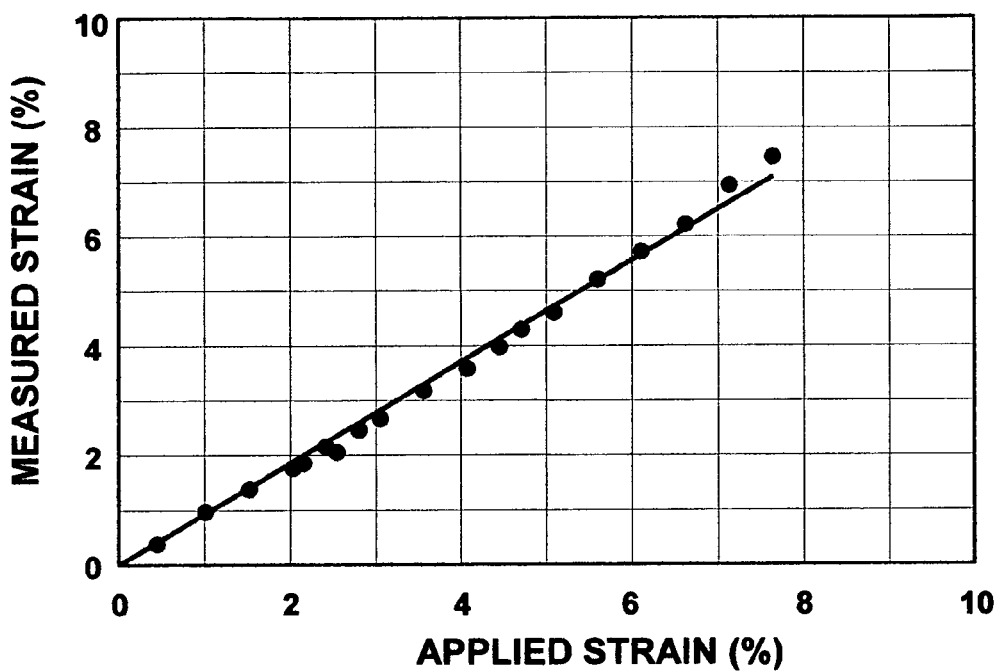
FIG. 8 is a graph showing a near one to one correspondence between the strain measured for a perfluorocarbon plastic optical fiber using the Optical Time Domain Reflectometer method and the applied strain.

As noted above, one of the disadvantages of plastic fibers relative to glass optical fibers is the greater loss of light (attenuation), which is on the order of 1000 time greater for polymethyl methacrylate. The light attenuation limits the length of mooring rope that can be monitored without loss of the laser light signal. A plastic optical fiber made from a perfluorinated amorphous polymer, such as the one made by Asahi Glass Company marketed under the trade name Lucina™ or CYTOPS™, has significantly less attenuation than polymethyl methacrylate fibers and thus exhibits the potential for transmission of light over much longer lengths of fiber. Thus far, the polymethyl methacrylate optical fiber has been found to have the least attenuation of plastic optical fibers studied. Depending on the number of reflective surfaces in the plastic optical fiber needed to made measurements of the strain in discrete gage lengths, it is expected to be able to make strain measurements along a length of 1000 feet or more. The amount of attenuation is also a function of the wavelength of light, but fortunately, the perfluorocarbon has low attenuation at the 850 nm range for which laser diodes, light-emitting diodes and OTDR instrumentation are readily available. A graph showing a nearly one to one correspondence for the strain response of the Optical Time Domain Reflectometer 18 measurement using a perfluorocarbon optical fiber and the applied strain is shown in FIG. 8. The mooring rope application does not require extremely long data transmission distances like telecommunications. With clever design parameters, the attenuation is manageable to allow the strain from relatively long length rope segments to be measured.

Figure 9:
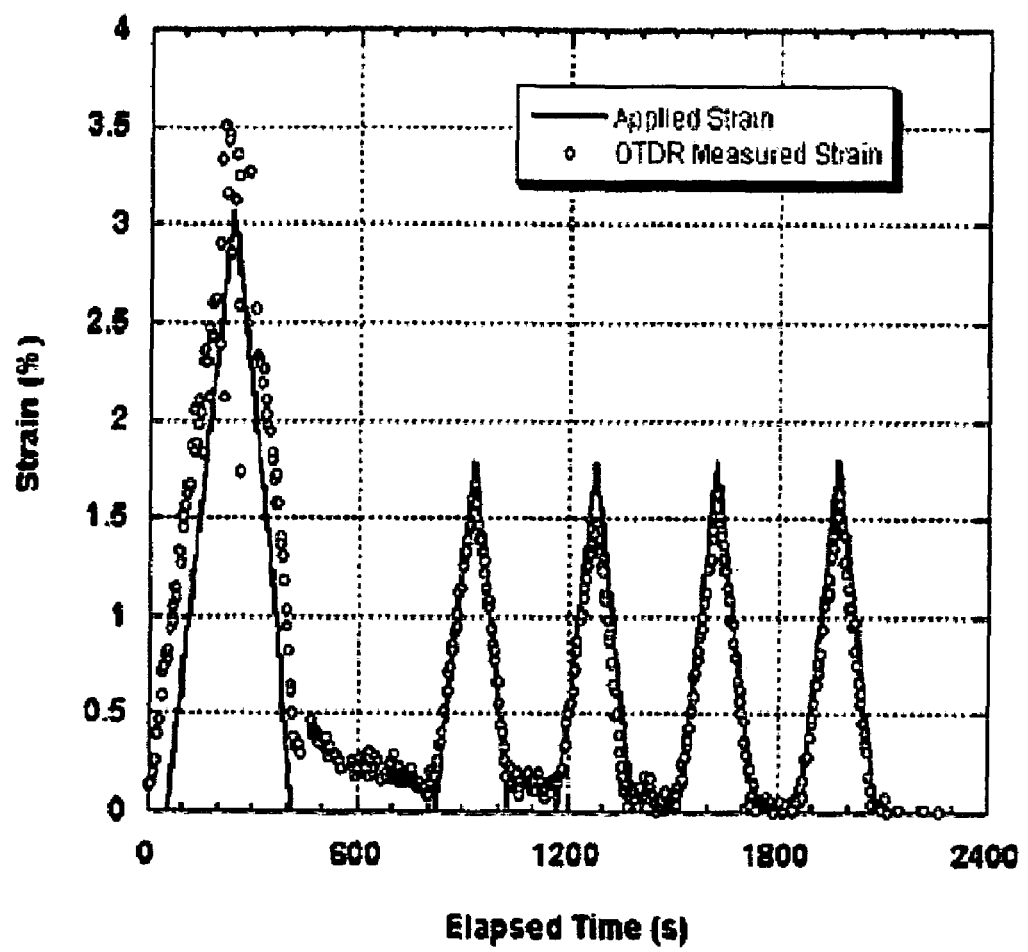
FIG. 9 is a graph comparing the response of the applied strain and the close tracking of the strain measured using the plastic optical fiber—Optical Time Domain Reflectometer method in which the plastic optical fiber is inserted into a braided rope optics carrier, plotted versus time for the first five cycles of loading.
Figure 10:
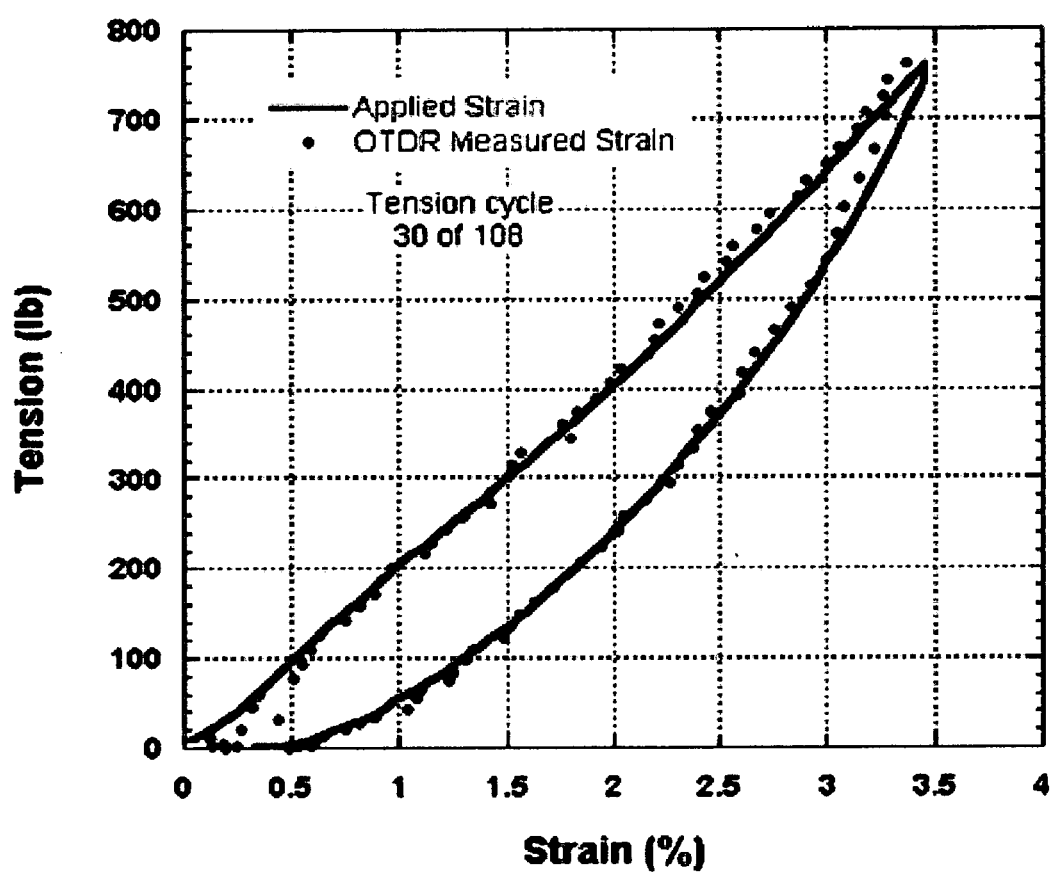
FIG. 10 is a graph comparing the load-strain response of the applied strain for a braided rope optics carrier 30 versus strain measurements make using Optical Time Domain Reflectometer 18 instrumentation and a plastic optical fiber 16 contained within the braided rope optics carrier illustrating the close ability of the system to follow the hysteresis response of the braided rope.

FIGS. 9 and 10 illustrate the good correlation between the applied strain and that measured by the Optical Time Domain Reflectometer 18 and plastic optical fiber 16. It also illustrates the ability of the plastic optical fiber to track in time the cyclic relaxation response of the rope into which it is inserted.

Figure 11:
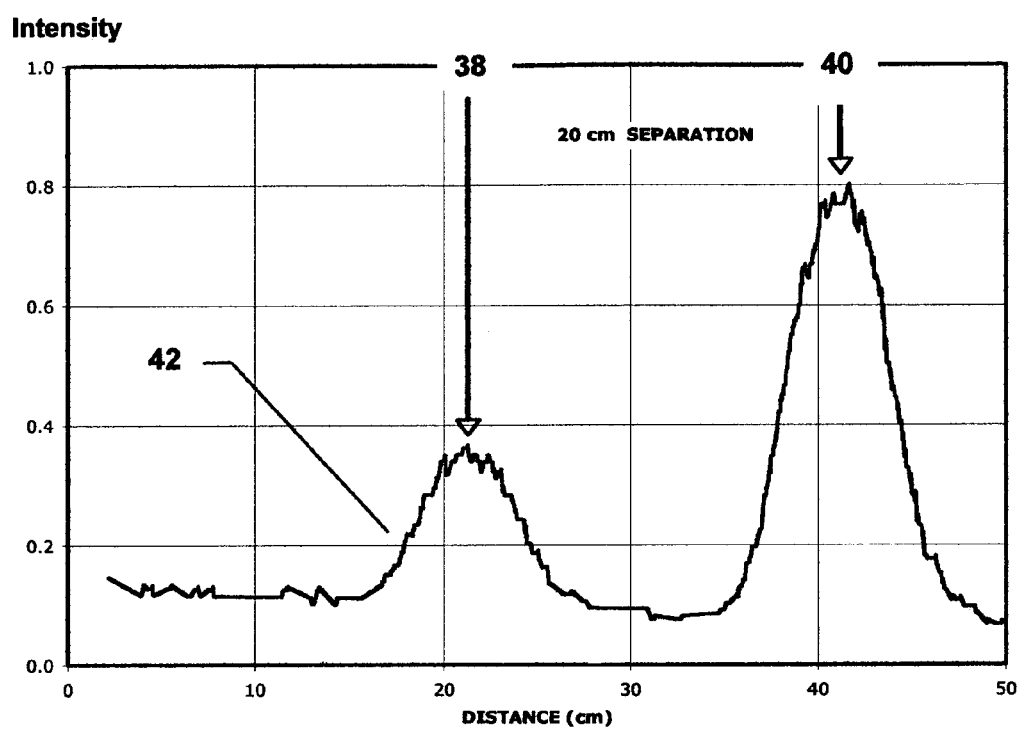
FIG. 11 shows the waveform display 42 from an Optical Time Domain Reflectometer instrument. The waveform represents two reflective interfaces 38 and 40, spaced 20 cm apart, that were etched on a plastic optical fiber. The intensities of the pulses are determined by the exposure time of the fiber to the interference pattern produced by the etching laser and superposed on the fiber at the interface position; the longer the exposure, the greater the fraction of light reflected and the larger the pulse on the OTDR waveform.

Reflective interfaces in the plastic optical fiber are an important component of the strain sensing technique. A method has been developed for placing these reflective interfaces at discrete locations along the length of the plastic optical fiber 16. The reflective interfaces are inserted after the fiber is manufactured. The reflective interfaces are one of the methods by which the strain gauge lengths are produced, that is, they define the discrete segments over which the mean strain is measurable. The reflective interfaces can also be inserted through interferometric methods (e.g., Bragg gratings), by splicing and fusing optical fibers, or by using physical contact connections. The method described herein for the fabrication of reflective interfaces in plastic optical fibers such as polymethyl methacrylate (PMMA) and perfluorinated polymers is accomplished by writing Bragg gratings into the core. The polymeric fiber is composed of long-chain cross-linked molecules having C—C, C—F, and C—O molecular bonds (in the case of perfluorinated polymers) or C—C, C—H, and C—O molecular bonds (in the case of poly(methyl) methacrylate polymers). The fabrication of gratings in both perfluorinated and poly(methyl) methacrylate polymers is based on the tendency of the polymers to photopolymerize when exposed to laser radiation. This photopolymerization enhances the cross-linking of the residual monomer, producing an increase in polymer density at the location of the photopolymerization. This increased polymer density is accompanied by an increase in refractive index. By periodically modulating the increase in refractive index over a short distance, a Bragg grating is thus produced in the fiber core. The refractive index modulation could be induced by any technique that changes the degree of cross-linking or density of the polymer, including any techniques that decreases the refractive index. The Bragg gratings are typically spaced at integral multiples of the wavelength of light to be transmitted in the fiber. The Bragg grating interfaces are not expected to all have the same amplitudes of reflection and transmission. The interfaces should have reflection and transmission values that provide the best OTDR waveforms. For instance, interfaces farthest from the OTDR could have larger reflectance amplitudes to compensate for the attenuation experienced by the light pulses as they travel longer distances back to the OTDR. FIG. 11 illustrates in graphic form two such reflective interfaces which have been created by an interferometric method to locally change the density of the plastic optical fiber.

The principal characteristic features of the method for making direct measurements of large strains in ropes using plastic optical fibers and measurement techniques including Optical Time-Domain Reflectometry or Optical Frequency Domain Reflectometry based on speed of light principles are summarized below.

The method provides a direct measurement of large strains in ropes, in particular, strains in synthetic fiber ropes such as the type used to moor floating platforms and marine vessels. The plastic optical fiber stretches in a near one-to-one correspondence with the stretch of the rope in which it is inserted. The use of Optical Time Domain Reflectometry or Optical Frequency Domain Reflectometry provides a direct measurement of the strain present in segmented lengths between reflective inclusions in the optical fiber.

The method uses plastic (polymeric) optical fibers to perform the function of stretching in concert with the straining of the rope and for transporting and reflecting light using optical fibers created from perfluorocarbon compounds, such as the type marketed by Asahi Glass Company under the trade name Lucina™, which have wavelength transmission and elastic (optoelastic) properties that are particularly suitable for following large strains (on the order of 10 percent) and for operating during hundreds or thousands of strain cycles (i.e., during alternations between small and large strains). Other compositions of plastic fibers, such as compositions of polymethyl methacrylate (PMMA), can also be used. The preferred use of the present perfluorocarbon compounds does not preclude the use of improved plastic fibers that might become available in the future. The size (diameter) of individual plastic optical fibers (500 micrometers) is typically 10–20 times greater than the size of the individual polymer monofilaments which comprise strands within the rope construction, although optical fibers that are smaller or larger are expected to perform equally as well as, or better than, these typically sized fibers.

The method provides a means using a braided rope optics carrier for imposing lateral compressive forces on the plastic optical fiber or plastic optical fiber jacketed with plastic protective sheath positioned longitudinally along the length of the rope and located in the center of the braided synthetic fiber rope optics carrier. When an optical fiber or jacketed optical fiber is inserted in the space (void) extending longitudinally at the center of a braided rope optics carrier, and a small axial strain is imposed on the rope; frictional forces between the optical fiber and plastic protective sheath (when provided) and rope fibers serve to restrain the optical fiber so that it cannot slip longitudinally within the rope. Furthermore, the frictional forces cause the fiber to experience an axial strain identical to that experienced by the braided rope optics carrier. This compressive stress and the attendant frictional forces reduce or eliminate the need for the fiber to be bonded either mechanically or chemically to the rope fibers.

The method allows the plastic optical fiber with plastic protective sheath positioned inside a braided rope optics carrier to occupy a very small fraction of the rope's total volume or cross-section. The braided rope optics carrier displaces a very small volume of rope and does not alter the mechanical properties of the rope or make the rope more difficult to manage or deploy. The primary function of the braided rope optics carrier is to facilitate incorporation of the plastic optical fiber within the rope assembly and to facilitate the transfer of axial strain from the rope assembly to the plastic optical fiber.

The method enables the inclusion of multiple plastic optical fiber strain sensors within a rope assembly. Many braided rope optics carriers with inserted plastic optical fiber(s) may be integrated into a single synthetic fiber rope assembly. The rope assembly may have a structural configuration that is twisted, braided, helically wound or of wire rope construction. The braided rope optics carrier with inserted plastic optical fiber may be placed in the interior of braided, twisted, helically wound or wire rope construction elements by being laid parallel to the strands of the rope elements. For synthetic fiber ropes used for mooring offshore platforms, a large number of subropes are typically laid parallel to form the total rope cross-section. In addition, braided rope optics carrier with interior plastic optical fibers may be inserted between and within the elements and subropes of the rope.

The method principles apply equally well to specialty rope architectures and designs such as ship mooring lines where strength is important but the twist or braid angle for these applications is typically much greater to accommodate greater stretch and wear.

The method may incorporate a protective covering on the optical fiber to protect the plastic optical fiber from the harsh offshore environments and from damage resulting from offshore operations. The fiber can be covered with a protective layer of a polymer or metal or be contained within a protective sleeve such as a plastic tube. The plastic protective sheath can seal the fiber from the harsh effects of moisture and chemicals in seawater and guard the fiber from abrasives such as sand, particulates and fibers. When using a plastic protective sheath for a protective covering, the covering may but does not have to be mechanically or chemically bonded to the optical fiber. Experimental evidence shows that the lateral compressive force applied by the synthetic fiber braided rope optics carrier is sufficient to keep the optical plastic fiber from slipping inside the plastic protective sheath beginning at near-zero axial strains.

The method incorporates a technique for the ingress and egress of the optical fiber into and out of the rope assembly. A means for connecting the embedded strain sensing fibers to external optical fiber cables must exist to provide a pathway for light signals from and back to the OTDR. One method for bringing the fibers in and out of the rope is to incorporate a protective ingress-egress guide into the rope assembly at the point of ingress or egress in such a way that the embedded optical fiber and braided rope optics carrier is protected from damage as it goes into or out of the rope interior. This guide must be strong enough to resist bending or crushing by the rope assembly and must be integrated into the rope assembly in a manner that does not impede the mechanical properties of the rope or the ease of use.

The method uses reflective interfaces placed in the optical fiber, after the plastic optical fiber is manufactured, as a necessary component of the strain sensing technique. The reflective interfaces are the means by which strain gauge lengths are introduced, that is, they define the discrete segments over which the mean strain is measured. The reflective interfaces might be inserted through interferometric methods (e.g., by the creation of Bragg gratings), by splicing and fusing optical fibers, or by using physical contact connections. The interfaces do not necessarily all have the same amplitudes of reflection and transmission. The interfaces should have reflection and transmission values that provide the best OTDR waveforms. For instance, it might be advantageous for the interfaces farthest from the OTDR to reflect a larger fraction of the propagating pulse to compensate for the attenuation experienced by the light pulses as they travel longer distances back to the OTDR.

The method can be used to locate and quantify damage within discrete sections of a rope assembly. The method and apparatus allows reflective interfaces to be placed at arbitrary points in the optical fiber, the interfaces being spaced at intervals corresponding to the desired gauge lengths for strain sensing, along the entire length of the plastic optical fiber. The limitations on the extent of the number of interfaces and their separations are primarily determined by the "dead zone" and dynamic range of the OTDR and the optical attenuation of the fiber. For example, it might be sufficient to space the reflective interfaces at distances of 10 meters where the fiber is in the main body of the rope, yet desirable to space the interfaces at distances of 1 meter where the fiber is in portions of the rope where the rope is terminated, stoppered, clamped, spliced or slung. The sensitivity of the plastic optical fiber in restricted length regions may be increased by traversing the plastic optical fiber back and forth in essentially the same region and by the insertion of Bragg detraction gratings.

The method can use alternative optical distance measurement techniques such as Optical Frequency Domain Reflectometry or phase-shift analysis to measure the separation between the reflective interfaces in the plastic optical fiber. Any method by which the separation between reflective interfaces can be determined can be considered applicable to this technique.

The method provides a technique to generate reflective interfaces in the plastic optical fiber by interferometric methods, by splicing and fusing, by using physical contact connections, or by any other means that causes reflections of the light at a discrete spatial position along the fiber for the purpose of creating gauges lengths in the fiber and thereby providing for the measurement of local strain values.

The method can use standard multiplexing techniques to enable multiple strain-sensing optical fibers to be placed in individual rope assembles, in a linked series of rope assemblies, or in a manifold of ropes or linked ropes on a single platform. A multiplexed system can provide a redundancy of strain measurements in a rope assembly, guarding against the loss of strain information and providing comparison measurements. A multiplexed system can provide a sensor network. A multiplexed system can reduce the cost of deployment because the system can use a single OTDR instrument.

Having thus described the invention, what is desired to be protected by Letters Patent is presented in the subsequently appended claims.

What is claimed is:

1. A system for measuring large strains, up to twenty percent, in ropes utilizing at least one plastic optical fiber integrated into the construction of said rope and instrumentation to measure the time required for light to be transported inside said plastic optical fiber comprising:
   a plastic optical fiber to permit transmission of light over long distances and exhibiting the capability to repeatedly sustain large strains with recovery to the same length as the rope upon the removal of the imposed load;
   integration of said optical fiber into a long length rope such that the assembly causes the rope to impose restraint to said optical fiber forcing it to experience the same axial strain as the rope and;
   optical instrumentation for measuring the time of flight-of-light through said plastic optical fiber and from reflective surfaces placed in said plastic optical fiber; and thus, the strain in the entire length or in discrete segments along the length of the rope.

2. A system as in claim 1 for measuring large strains in ropes, wherein said means for transmitting light over long distances include plastic optical fibers selected from the group of materials comprising perfluorocarbon and polymethyl methacrylate which exhibit the capability to repeatedly sustain large strains with relaxation and recovery to nearly the same length upon the removal of the imposed load; exhibit low attenuation; have a small diameter; and exhibit a characteristic stress-strain response similar to synthetic fibers used in marine ropes.

3. A system as in claim 1 for measuring large strains in ropes, wherein said means for measuring the time of flight-of-light to and from reflective surfaces in a plastic optical fiber and thus the strain in segments along the length of the plastic optical fiber, comprises an optical time domain reflectometer.

4. A system as in claim 1 for measuring large strains in ropes, wherein said means for an assembly includes a plastic optical fiber comprised of a core material, cladding material and outer jacket or buffer coating surrounded by a plastic protective sleeve, sheath or furcation-type tubing which protects the plastic optical fiber from the marine environment and restrains it from local bending.

5. A system as in claim 1 for measuring large strains in ropes wherein plastic optical fibers integrated into the rope construction provide critical information to monitor the performance and safety of ropes used in numerous onshore and marine applications including synthetic fiber mooring ropes to anchor offshore platforms and ropes used in docking vessels.

6. A system as in claim 5 for measuring large strains in ropes further comprising:
   placement of plastic optical fiber within any portion of a rope assembly comprising: strands, elements in which numerous strands form elements, subropes in which several elements are assembled into a subrope, or anywhere in the rope in which several subropes are laid parallel or with a small twist to form a rope.

7. A system as in claim 1 for measuring large strains in synthetic fiber ropes constructed from materials of the group comprising polyester, nylon, aramid, and polypropylene in rope constructions comprising twisted, braided, parallel lay, wire rope and other rope architectures.

8. A system as in claim 1 for measuring large strains in ropes further comprising:
   a method for providing ingress and egress of the optical fiber into and out of the subrope assembly, comprising a plastic or metallic tubular guide to protect the plastic optical fiber with or without a plastic protective sheath surrounding the optical fiber.

9. A system as in claim 1 for measuring large strains in ropes further comprising:
   a minimally invasive braided rope with braid angle of 10-degrees, plus or minus 5-degrees, constructed of synthetic fiber including materials from the group comprising polyester, aramid, polytheylene and nylon, for the purpose of restraining the plastic protective sheath and protecting the plastic optical fiber contained therein; forcing the optical fiber to experience a strain identical to the large rope into which the assembly is inserted.

10. A system as in claim 1 for measuring large strains in ropes, wherein said means for measuring the time of flight of light to and from reflective surfaces in a plastic optical fiber and thus the strain in segments along the length of the plastic optical fiber comprises an optical frequency domain reflectometer.

11. A system as in claim 1 for measuring large strains in ropes wherein said method is used to measure strain in the region of the terminations such as eye terminations.

12. A system as in claim 1 for measuring large strains in ropes wherein transfer of the light signal from remote locations to the time of flight instrumentation utilizes lower attenuation unstrained glass optical fibers; and signal transmitters to obtain data from remote locations of the rope such as near the sea bed of an offshore platform mooring rope.

13. A system as in claim 1 for measuring large strains in ropes wherein the optical instrumentation for measuring the time of flight of light is capable through multiplexing to monitor several plastic optical fibers in the same rope or multiple ropes in rapid sequence.

14. A system for measuring large strains in ropes to monitor their performance and safety further comprising:
   a low attenuation, small diameter, plastic optical fiber including optical fibers from the group comprising perfluorocarbon, and polymethyl methacrylate which exhibit a stress-strain response similar to synthetic fibers used in ropes, and exhibit the capability to transmit light over long distances and furthermore exhibit the capability to repeatedly sustain large strains with recovery to nearly the same length upon the removal of the imposed load;
   an optical instrument selected from the group comprising an optical time domain reflectometer and optical frequency domain reflectometer, for measuring the time of flight-of-light to and from reflective surfaces in a plastic optical fiber and thus the strain in the total length or in discrete segments along the length of the plastic optical fiber;
   a synthetic fiber rope constructed of materials comprising polyester, aramid, polypropylene and nylon elements and subropes with plastic optical fibers integrated therein;
   a plastic optical fiber assembly consisting of a plastic optical fiber which transmits and reflects light surrounded by a plastic protective sheath which protects the plastic optical fiber from the marine environment and restrains it from local bending;

a small minimal inclusion braided rope optics carrier having a braid angle of 10-degrees + or − 5-degrees constructed of synthetic fibers selected from the group comprising polyester, aramid, polytheylene and nylon;

a braided rope plastic fiber optic carrier to protect the plastic optical fiber and to restrain it to experience the same stain as the rope into which it is placed; and, an ingress-egress guide to protect the plastic optical fiber bundle including the plastic optical fiber and the plastic protective sheath at locations of entry into and exit from the rope.

* * * * *